United States Patent Office 2,844,481
Patented July 22, 1958

2,844,481
MILK SOLIDS COMPOSITIONS AND METHOD OF MAKING

Martin F. Langworthy, Lowell, Mich.

No Drawing. Application May 11, 1953
Serial No. 354,403

17 Claims. (Cl. 106—146)

The present invention relates to a method for treating milk to remove therefrom certain solids, and to compositions which contain such solids.

Heretofore, milk solids have been separated from whole milk by a variety of procedures including self-souring, curdling with rennet, and curdling by rendering the milk slightly on the acidic side. Due to the development of rancidity of the fat portion of the precipitated milk solids from whole milk, the fatty portion is usually removed prior to the separation of the milk solids. U. S. Patent 745,097 teaches the elimination of the fat from whole milk by rendering the milk alkaline and centrifuging, and thereafter making the fat-free milk slightly acid to precipitate casein solids. U. S. Patent 1,428,820 discloses a process for separating solids from the fluid left after the separation of the curd from the milk in the process of making cheese or the fluid obtained after the separation of casein which comprises acidifying such whey solutions in a plurality of steps and collecting the precipitate between each step. In all the known various commercial methods of producing casein or other milk solids by rendering the milk solution acidic, only sufficient acid is added to effect the separation of the curd from the whey. The addition of excess acid is carefully avoided so that the curd will remain water insoluble and can be washed in water to eliminate residual traces of the whey.

In accordance with this invention, it has been found that it is unexpectedly advantageous to precipitate milk solids by adding acid to the milk in an amount in excess of that required to precipitate the solids and in sufficient quantity to produce a solution at least as acid as a pH of 4.0. The solids which result from this procedure are water soluble and have been found to possess film-forming and emulsifying characteristics which are not present in casein or other milk solids separated from milk solutions which are less acid than a pH of about 4. It has additionally been found that aqueous alkaline solutions of skim milk, powdered milk or commercial casein yield new and novel solids when subjected to a similar treatment with acid in an amount sufficient to produce a solution at least as acid as a pH of 4.0. The solids resulting from this process, when admixed with an alkaline material to form a paste or an aqueous solution or essentially an aqueous solution are compositions of this invention. Moreover the milk solids which remain in solution after acidifying the milk or milk-like solution to an acidity at least as acid as a pH of 4.0 are useful for the formation of protective coatings and may be readily recovered by evaporating the water from the solution.

It is to be clearly understood that the method of this invention comprises the sequential steps of adding an alkali to whole milk or essentially fat-free milk to produce a solution which is definitely alkaline and has a pH numerically higher than 7.0, and thereafter adding an acid in an amount sufficient to produce a solution at least as acid as a pH of 4.0 and separating the solids thus formed. The method may optionally include the added step of combining the milk solids thus produced with additional alkali to form a paste or a water solution.

The first step of adding alkali is necessary regardless of the presence of fat in the starting milk solution, and its purpose is not to separate out the fat but rather to condition the milk solution so that the excess acid will in all cases produce a water soluble curd.

For certain purposes it has been found to be desirable to permit the milk or milk-like solution to stand after rendering it alkaline until the separated solids have settled out. Alternatively, the solids thus separated may be removed by filtration. The clear liquid is then rendered at least as acid as a pH of 4.0, and the solids collected in the resulting foam, which solids do not include the alkaline-insoluble solids. Moreover the alkaline-insoluble solids may be beneficially used by subjecting them to the excess acid precipitation step of this invention. Such alkaline-insoluble solids may be re-mixed with water and the solution acidified at least as acid as a pH of 4.0 and the resultant solids collected. The final solids of these modified procedures are converted into useful form by adding a water soluble alkali thereto in sufficient quantity to form a homogeneous mixture. The milk used may be whole milk but is preferably fat free milk such as skim milk or powdered milk. The method is also applicable to aqueous alkaline solutions of casein.

The word "solution" as used herein, covers colloidal solutions as well as so-called "true" solutions. The expression "acid insoluble solid" refers to a solid phase precipitated from such solutions when those solutions are made at least as acid as a pH of 4. The expression "alkali or alkaline insoluble solid" refers to a solid phase precipitated from such solutions when those solutions are made alkaline, and have a pH numerically greater than 7.0.

The water soluble alkali may be the hydroxides of sodium, potassium and the like or may be salts with an alkaline reaction such as the alkali metal carbonates. It is necessary only that the alkali material be water-soluble and that it be capable of rendering the solution alkaline. Similarly, the water soluble carbonate may me any water-soluble carbonate, it being necessary only that it be water soluble and capable of liberating carbon dioxide upon the addition of acid.

The acid used may be any acid or acidic salt capable of neutralizing the alkaline material used and, further, capable of rendering the solution acid. The mineral acids are preferred in contrast to organic acids because they are cheaper and because equivalent effects can be secured with relatively smaller quantities of the acid. In order to form an acidic water-soluble curd from the alkalized milk or milk-like solutions of this invention, it is necessary to add sufficient acid to produce an acidity at least as acid as a pH of 4.0. Additional acid may be employed and the desired curd is formed at acidities as great as a pH of 0.0. For practical purposes, it is preferred to employ sufficient acid to produce solutions having a pH in the range of 0.0 to 2.0.

The proportion of water-soluble alkali which should be added to the milk is not critical, but from a practical standpoint is quite low. The preferred amount is that amount which will render the milk or milk-like solution definitely alkaline and numerically above a pH of 7.0. It is suitable to employ from one to several percent of sodium carbonate for example, this amount being sufficient to precipitate the alkali insoluble solids.

The proportion of alkali in the paste is not critical. It is necessary only that the milk solids come in intimate contact with the concentrated alkali material and form a homogeneous mixture therewith. It is not known for certain whether the alkali induces a chemical reaction with the milk solids or whether it makes certain ingredients more soluble, but in any event the paste has superior surface-active characteristics and when diluted with water can yield, upon evaporation, an adhesive film forming composition. This film may include all the milk solids of the paste or may include only those made soluble by the treatment with the alkali. In the latter case the paste may be thinned with water, preferably containing about 2.5% ethyl alcohol as a preservative, to form a water solution of the soluble ingredients of the paste. The clear supernatant liquid may then be decanted from the settled solids. The clear decanted liquid, upon evaporation, yields an excellent adhesive material, and if the liquid is poured over an article in a thin layer, evaporation of the liquid leaves a transparent film on the object which dries to a waterproof coating.

The liquid which remains after the solids have been removed from the acidified solution may be evaporated to form a waterless, paste-like substance which is useful for coating and protective purposes such as the preservation of cut flowers and the like.

The below examples illustrate in greater detail the method and composition of this invention.

*Example 1*

One teaspoonful of sodium carbonate was added to one quart of skim milk. When the sodium carbonate had completely dissolved, sufficient hydrochloric acid was added to the mixture to produce a pH of 3.0. A vigorous foaming resulted and the foam was permitted to stand above the surface of the liquid until substantially all excess liquid had drained from the foam. The foam was then picked off and placed in a separate container.

A concentrated aqueous solution of sodium carbonate was added to the solids of the foam in a quantity sufficient to form a paste. The paste is a primary composition of the invention. Portions of the paste were then added to a variety of insecticidal sprays in a proportion of about one part of the paste to one hundred fifty parts of the spray. It was found that the paste caused each of the insecticidal sprays to spread readily on plant foliage. Further it was found that upon the drying of the spray a thin adherent film of the milk solids was produced on the foliage which held the toxic ingredients of the spray in contact with the foliage for greater periods of time than with the use of the insecticidal spray itself.

The residual liquid was evaporated to form a brown, syrupy material and found to be useful in forming protective coatings on cut flowers and the like.

*Example 2*

A paste made in the manner of Example 1 was thinned with water to a point where it flowed freely. The resulting liquid was thinly sprayed on foliage which had been cut for use for decorative purposes. The liquid formed thin adherent film which appeared to conserve the moisture of the plants causing them to retain their original appearance for several months.

*Example 3*

The paste of Example 1 was thinned with water and about 2½% alcohol was added as a preservative. The mixture was permitted to stand and the clear liquid was then poured off the top. The solid material in the settled paste was mixed with paints in order to increase their fire resistance. The clear liquid was found to contain in solution a solid material which is a good adhesive and upon evaporation of the water formed a water proof coating. The latter liquid may be mixed with mortar to yield a product which takes paint substantially as smoothly as a metal surface.

*Example 4*

A powdered milk which had been prepared from skim milk by a vacuum drying method was mixed with water to the consistency of ordinary liquid skim milk. Several teaspoonful of sodium carbonate were added to a quart of the skim milk and the solution was warmed to hasten the separation of solids. It was then permitted to stand. The solids which separated out from the solution were removed therefrom.

The alkaline liquid remaining after the separation of the alkaline insoluble solids was treated with sufficient hydrochloric acid to produce a pH of 0.0. There was a vigorous foaming, and the foam was permitted to stand until substantially all the excess liquid drained therefrom. The foam was then separated from the residual liquid and placed in a separate container. The acid insoluble solids of the foam were then mixed with a concentrated aqueous solution of sodium carbonate to the consistency of a paste. This paste differs from the paste of Example 1 in that it does not contain the alkaline insoluble solids. It is much clearer in appearance and produces films with a high degree of transparency. It may be used in much the same manner as the paste of Example 1. It is particularly useful in combination with printers ink. A drying of the ink causes the formation of a coating which brings out the colors.

The primary paste composition and the analogous compositions of the invention have found use as emulsifying agents for asphalt, turpentine, and the like and particularly as emulsifying agents for linseed oil in automobile polishing compounds and in fire-resistant paints. The spreading characteristics of insecticidal sprays has been improved particularly where inorganic insecticides are used; for example, lime-sulfur, lead arsenate, Bordeaux mixtures, etc. The property of the present compositions to form adherent glossy films has found use in the preservation of cut flowers; the preservation of and enhancement of color in oil paintings; and the enhancement of color in printers ink, in sign paints, and in shoe polish.

This application is a continuation-in-part of copending application, Serial No. 122,598, filed October 20, 1949, and now abandoned.

What is claimed is:

1. In a method of preparing valuable products from a liquid milk product, the steps which comprise adding an alkali to said liquid milk product to render the latter alkaline, admixing an acid with said solution in amount sufficient to reduce the pH of said solution to a pH in the range of 0.0 to 4.0 whereby a foam is formed, removing said foam, and then adding an aqueous solution to an alkali to the solids in said foam.

2. In a method of preparing valuable products from a liquid milk, the steps which comprise adding an aqueous solution of sodium carbonate to liquid milk to render the latter alkaline, admixing aqueous hydrochloric acid with said solution in amount sufficient to reduce the pH of said solution to a pH in the range of 0.0 to 2.0 whereby a foam is formed, removing said foam, allowing said foam to drain at least partially whereby to recover the solids of said foam, and then adding an aqueous solution of an alkali to said recovered solids.

3. In a method of preparing valuable products from a liquid milk product, the steps which comprise adding an aqueous solution of sodium carbonate to a liquid milk product to render the latter alkaline, separating the solution from any precipitated solids, admixing aqueous hydrochloric acid with said solution in amount sufficient to reduce the pH of said solution to a pH in the range of 0.0 to 4.0 whereby to form a precipitate and whereby also to form a foam which rises to the surface, removing said foam, allowing said foam to drain at least partially whereby to recover the solids of said foam, and then adding an aqueous solution of sodium carbonate to said recovered solids from said foam.

4. In a method of preparing valuable products from liquid skim milk, the steps which comprise adding an aqueous solution of sodium carbonate to liquid skim milk to render the latter alkaline, admixing an acid with said solution in amount sufficient to reduce the pH of said solution to a pH in the range of 0.0 to 4.0 whereby a foam is formed, removing said foam, allowing said foam to drain whereby to recover the solids of said foam, and then adding an aqueous solution of an alkali to said recovered solids whereby to form a product of pasty consistency.

5. In a method of preparing valuable products from liquid skim milk, the steps which comprise adding an aqueous solution of sodium carbonate to liquid skim milk to render the latter alkaline, separating the solution from any precipitated solids, admixing aqueous hydrochloric acid with said solution in amount sufficient to reduce the pH of said solution to a pH in the range of 0.0 to 4.0 whereby a foam is formed, removing said foam, allowing said foam to drain whereby to recover the solids of said foam, and then adding an aqueous solution of soium carbonate to said recovered solids whereby to form a product of pasty consistency.

6. In a method of preparing valuable products from a liquid milk product, the steps which comprise adding an alkali to said liquid milk product to render the latter alkaline, separating the solution from any precipitated solids, admixing an acid with said solution to amount sufficient to reduce the pH of said solution to a pH in the range of 0.0 to 4.0 whereby to form (a) a precipitate and whereby (b) also to form a foam which rises to the surface, removing said foam, allowing said foam to drain whereby to recover the solids of said foam, then adding an aqueous solution of an alkali to said recovered solids whereby to form a product of pasty consistency, and separately admixing said (a) precipitate, without washing the same, with an aqueous solution of an alkali to produce a homogeneous thin paste.

7. In a method of preparing valuable products from liquid skim milk, the steps which comprise adding an aqueous solution of sodium carbonate to liquid skim milk to render the latter alkaline, separating the solution from any precipitated solids, admixing aqueous hydrochoric acid with said solution in amount sufficient to reduce the pH of said solution to a pH in the range of 0.0 to 4.0 whereby to form (a) a precipitate and whereby (b) also to form a foam which rises to the surface, removing said foam, allowing said foam to drain whereby to recover the solids of said foam, then adding an aqueous solution of sodium carbonate to said recovered solids whereby to form a product of pasty consistency, and separately admixing said (a) precipitate, without washing the same, with an aqueous solution of sodium carbonate to produce a homogeneous thin paste.

8. In a method of preparing valuable products from a liquid milk product, the steps which comprise adding an alkali to a liquid milk product to render the latter alkaline, removing any solids which precipitate as a result of said treatment, admixing an acid with the remaining solution to reduce the pH to within the range of 0.0 to 4, separating the solids which precipitate and, without washing said solids, admixing them with an aqueous alkaline solution to produce a homogeneous thin paste.

9. In a method of preparing valuable products from a liquid milk product, the steps which comprise adding an aqueous solution of sodium carbonate to a liquid milk product to render the latter alkaline, removing any solids which precipitate as a result of said treatment, admixing hydrochloric acid with the remaining solution to reduce the pH to within the range of 0.0 to 2, separating the solids which precipitate and, without washing said solids, admixing them with an aqueous solution of sodium carbonate to produce a homogeneous thin paste.

10. In a method of preparing valuable products from liquid skim milk, the steps which comprise adding an alkali to liquid skim milk to render the latter alkaline, admixing an acid with the resulting solution to reduce the pH to within the range of 0.0 to 2, separating the solids which precipitate and, without washing said solids, admixing them with an aqueous alkaline solution to produce a homogeneous thin paste.

11. In a method of preparing valuable products from a milk product, the steps which comprise adding an aqueous solution of an alkali to casein to produce an alkaline solution of said casein, admixing said solution with an acid to reduce the pH to within the range of 0.0 to 4.0, removing the solids which separate out, and, without washing said solids, adding an aqueous solution of an alkali thereto to form a product of pasty consistency.

12. In a method of preparing valuable products from a liquid milk product, the steps which comprise adding an alkali to said liquid milk product to render the latter alkaline, separating the solids which precipitate therefrom, admixing said solids with water, adding an acid to said mixture to reduce the pH to within the range of 0.0 to 4.0, removing the solids which separate out, and adding an aqueous solution of an alkali to said last-mentioned solids to form a product of pasty consistency.

13. In a method of preparing valuable products from a liquid milk product, the steps which comprise adding an alkali to said liquid milk product to render the latter alkaline, separating the solids which precipitate therefrom, admixing the alkaline solution remaining after separating the solids with an acid to reduce the pH to within the range of 0.0 to 4.0, removing the solids which separate out, and then adding an aqueous solution of an alkali to said removed solids to form a product of pasty consistency.

14. In a method of preparing valuable products from a liquid milk product, the steps which comprise adding an alkali to said liquid milk product to render the latter alkaline, (a) separating the solids which precipitate therefrom from the remaining alkaline solution, admixing said solids with water, adding an acid to said mixture to reduce the pH to within the range of 0.0 to 4.0, removing the solids which separate out, adding an aqueous solution of an alkali to said last-mentioned solids to form a product of pasty consistency, (b) separately adding, to the alkaline solution remaining after separating the solids as specified in part (a), an acid to reduce the pH of said solution to within the range of 0.0 to 4.0, removing the solids which separate out, and then adding an aqueous solution of an alkali to said removed solids to form a product of pasty consistency.

15. A new and useful product comprising an aqueous pasty material possessing relatively high surface-active characteristics and the capacity to yield film-forming compositions upon dilution with water and evaporation of the latter, and having been made by the process of claim 1.

16. A new and useful product comprising an aqueous pasty material possessing relatively high surface-active characteristics and the capacity to yield film-forming compositions upon dilution with water and evaporation of the latter, and having been made by the process of claim 8.

17. A new and useful product comprising an aqueous pasty material possessing relatively high surface-active characteristics and the capacity to yield film-forming compositions upon dilution with water and evaporation of the latter, and having been made by the process of claim 12.

References Cited in the file of this patent

UNITED STATES PATENTS

| | | |
|---|---|---|
| 745,097 | Eberhard | Nov. 24, 1903 |
| 1,428,820 | Thomson | Sept. 12, 1922 |
| 2,236,271 | Kratz | Mar. 25, 1941 |
| 2,639,235 | Kennedy et al. | May 19, 1953 |